(12) United States Patent
Lewin et al.

(10) Patent No.: US 8,145,011 B2
(45) Date of Patent: Mar. 27, 2012

(54) CORRELATION APPARATUS

(75) Inventors: Andrew C Lewin, Malvern (GB);
Rebecca A Wilson, Malvern (GB);
Gregor J McDonald, Malvern (GB)

(73) Assignee: QinetiQ Limited, London (GB)

( * ) Notice: Subject to any disclaimer, the term of this patent is extended or adjusted under 35 U.S.C. 154(b) by 879 days.

(21) Appl. No.: 12/086,213

(22) PCT Filed: Dec. 12, 2006

(86) PCT No.: PCT/GB2006/004646
§ 371 (c)(1),
(2), (4) Date: Jun. 6, 2008

(87) PCT Pub. No.: WO2007/068914
PCT Pub. Date: Jun. 21, 2007

(65) Prior Publication Data
US 2009/0034969 A1   Feb. 5, 2009

(30) Foreign Application Priority Data

Dec. 12, 2005 (GB) .................................. 0525234.1

(51) Int. Cl.
*G06K 9/64* (2006.01)
*G06K 9/00* (2006.01)
*G06K 9/54* (2006.01)
*G06K 9/60* (2006.01)

(52) U.S. Cl. .................. 382/278; 382/181; 382/304

(58) Field of Classification Search .................. 382/181, 382/278, 304; 398/43
See application file for complete search history.

(56) References Cited

U.S. PATENT DOCUMENTS

| 4,542,505 | A | | 9/1985 | Binoeder et al. | |
|---|---|---|---|---|---|
| 4,878,233 | A | * | 10/1989 | Hayashi | 375/368 |
| 5,054,090 | A | | 10/1991 | Knight et al. | |
| 5,140,618 | A | * | 8/1992 | Kinoshita et al. | 375/368 |
| 5,239,497 | A | | 8/1993 | McKay et al. | |
| 6,067,331 | A | | 5/2000 | Garcia | |
| 6,285,795 | B1 | * | 9/2001 | Cho | 382/243 |
| 6,862,296 | B1 | | 3/2005 | Desai | |
| 2001/0021048 | A1 | * | 9/2001 | Desurvire | 359/124 |

FOREIGN PATENT DOCUMENTS

| CN | 1323105 | 11/2001 |
|---|---|---|
| EP | 0 663 635 | 7/1995 |
| EP | 0 889 606 | 1/1999 |
| EP | 1 185 008 | 3/2002 |

(Continued)

OTHER PUBLICATIONS

International Search Report for PCT/GB2006/004646, mailed Apr. 16, 2007.

(Continued)

*Primary Examiner* — John Strege
(74) *Attorney, Agent, or Firm* — Nixon & Vanderhye P.C.

(57) ABSTRACT

This invention relates to a pattern recognition correlator in which a serial input data signal is converted into a parallel data signal for correlation with one or more reference data signals. The invention relates to use of a demultiplexer in such a correlation apparatus to reduce the data update rate for the subsequent components. The invention also relates to the use of a series of latch circuits to provide serial to parallel conversion of the input data signal in the electrical domain.

2 Claims, 5 Drawing Sheets

FOREIGN PATENT DOCUMENTS

| | | |
|---|---|---|
| GB | 1 476 880 | 6/1977 |
| GB | 2 236 605 | 4/1991 |
| GB | 2386728 | 9/2003 |
| GB | 2 419 208 | 4/2006 |
| JP | 57-193865 | 11/1982 |
| JP | 59-22175 | 2/1984 |
| JP | 61-36882 | 2/1986 |
| JP | 62-11572 | 5/1987 |
| JP | 1-156879 | 6/1989 |
| JP | 1-277984 | 11/1989 |
| JP | 3-219737 | 9/1991 |
| JP | 5-35923 | 2/1993 |
| WO | 93/14604 | 7/1993 |
| WO | 94/21088 | 9/1994 |
| WO | 2004/012025 | 2/2004 |

OTHER PUBLICATIONS

Written Opinion of the International Searching Authority for PCT/GB206/004638, dated Apr. 16, 2007.

Great Britain Search Report for GB Application No. 0525234.1, dated Apr. 26, 2006.

Great Britain Search Report for GB Application No. 0525234.1, dated Jul. 31, 2006.

Nishikido, J et al., "Optical Routing Control Using Coherent Pattern-Matching Circuit Form Photonic Self-Routing Switch", One World Through Communications, pp. 459-467, (May 8, 1992).

Gurkan D. et al., "All-Optical Address Recognition for Optically-Assisted Routing in Next-Generation Optical Networks", IEEE Communications Magazine, vol. 41, No. 5, pp. 72-78, (May 2003).

Hauer, M.C. et al., "Optically Assisted Internet Routing Using Arrays of Novel Dynamically Reconfigurable FBG-Based Correlators", Journal of Lightwave Technology, pp. 2765-2778, (Nov. 2003).

Yu, B. Y. et al., "Network Demonstration of 100 Gbit/s Optical Packet Switching With Self-Routing", Electronics Letters, vol. 33, No. 16, pp. 1401-1403, (Jul. 31, 1997).

Nakahara, T. et al., "100 Gbit/s Optical-Packet Self-Routing by Self Serial-To-Parallel Conversion", Optical Society of America / Institute of Electrical and Electronics Engineers, vol. TOPS., No. 70, pp. 266-267, (Mar. 17, 2002).

Takenouchi H. et al., "High-Speed Optical Packet Processing Technologies for Optical Packet-Switched Networks", IEICE Transactions on Electronics, pp. 286-294, (Mar. 2005).

EP Examination Report dated Apr. 28, 2011 in EP 06 831 379.0.

Chinese First Office Action dated Jun. 2, 2010 in CN 200680052717.4.

F. Forghieri et al, "Novel Packet Architecture for All-Optical Ultrafast Packet-Switching Networks" *Electronics Letters*, vol. 28, No. 25, Dec. 1992, pp. 2289-2291.

English translation of Second Office Action dated Dec. 7, 2011 in CN 200680052717.4.

* cited by examiner

CORRELATION APPARATUS

This application is the U.S. national phase of International Application No. PCT/GB2006/004646, filed 12 Dec. 2006, which designated the U.S. and claims priority to Great Britain Application No. 0525234.1, filed 12 Dec. 2005, the entire contents of each of which are hereby incorporated by reference.

This invention relates to an apparatus and method for pattern recognition, i.e. the correlation of search data with reference data, especially to an apparatus for converting a temporal data stream into a parallel data pattern for the purpose of performing correlation.

Pattern recognition is concerned with the process of recognising one or more known objects in incoming data, for example text or imagery, by comparing known reference object(s) with the data. An ideal way to perform pattern recognition autonomously is through the mathematical operation of correlation. This patent is concerned with an improved correlator.

There are many areas in which pattern recognition is used, from interrogating databases to locate specific search terms to biometric based recognition systems and target identification in two-dimensional imagery. Often the search is performed digitally using a suitably programmed processor to compare a known reference data string with the data to be searched to identify a match. One example is an internet search engine which compares one or more input reference words with internet data to identify a match.

When searching very large amounts of data however software based pattern identification techniques may be slow or require very large processing power. Also when data is received at high data rates, for example at telecommunications data transfer rates, software based systems may be unable to perform correlation at this speed.

Optical pattern recognition systems known as matched filters or correlators are also known and can be used to match spatial patterns. One of the earliest such schemes is the Vander Lugt optical matched filter described in A Vander Lugt, "Signal detection by complex spatial filtering", IEEE Trans. Inf. Theory IT-10, p 139-145 (1964). This system uses an optical arrangement to multiply the Fourier Transform of a scene with the conjugate Fourier Transform of a reference pattern before performing an inverse Fourier Transform on the combined pattern. If a strong correlation exists between the reference and the image a sharp bright peak is produced in the back focal plane of the system. Thus this system compares an observed image with a reference image and indicates if there is a correlation, and, if so, where it occurs—that is the system identifies the presence and location(s) of a target in a scene. More recent optical pattern recognition systems perform the Fourier Transforms (FTs) of the scene and reference pattern electronically and display the combined FTs on a spatial light modulator (SLM) thereby simplifying and speeding up the operation, see for example the correlator described in International Patent Application WO 00/17809. Such optical pattern recognition systems can work well for target identification in an observed scene etc. but for searching data repositories they require updating of an SLM with either the data to be searched or the combined data and reference pattern. Even with fast SLMs the update speed of the SLM limits the speed of correlation for the latter application. Note—as used herein the term correlator will be taken to include matched filters based systems.

Recently it has been proposed to apply the benefits of optical correlation to high speed pattern matching. Our co-pending patent applications PCT/GB2005/004028 and GB0423093.4 describe a correlator apparatus that uses fast phase modulation and parallel optical processing to allow high speed correlation.

Figure 1:
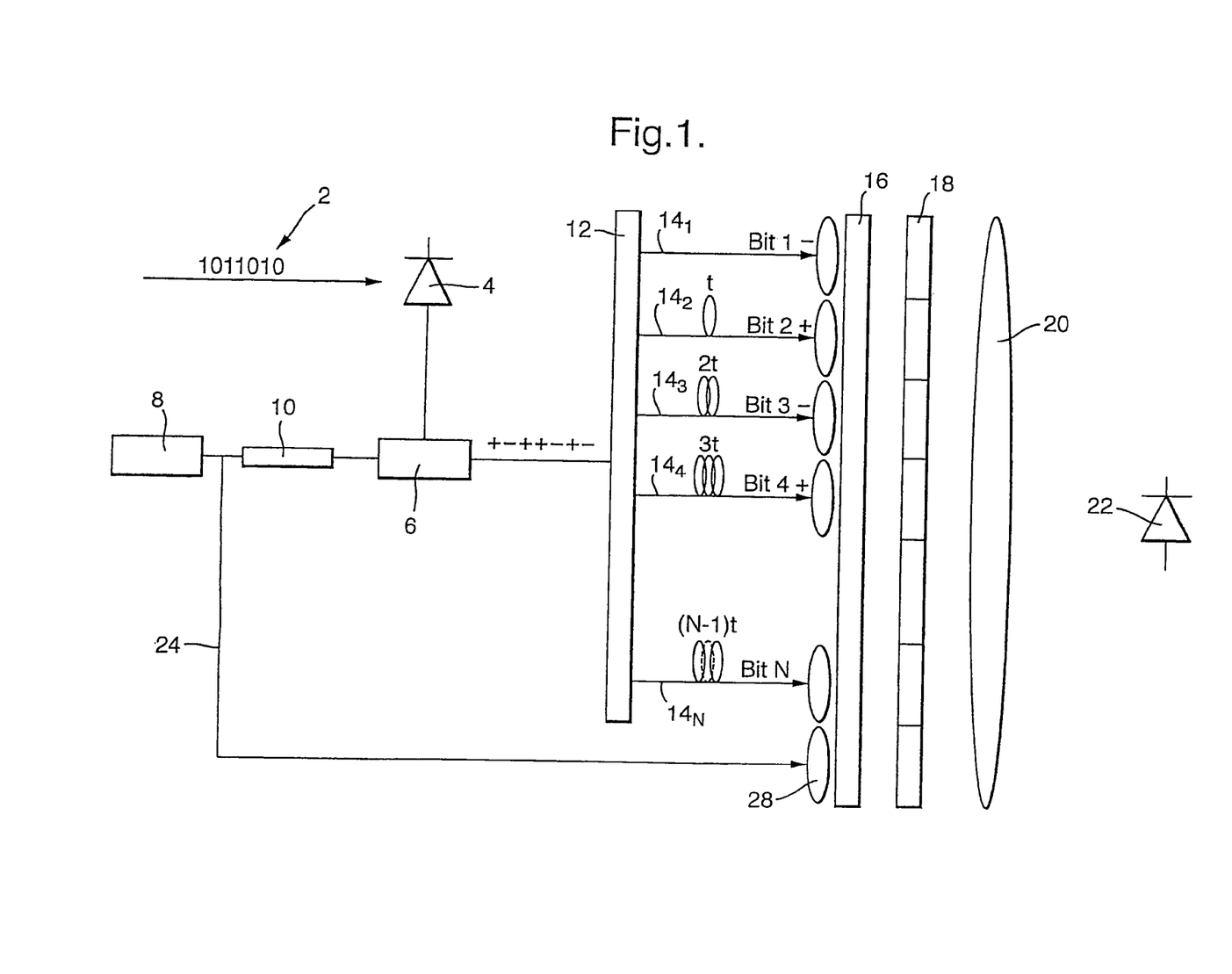
FIG. 1 shows an optical correlator as described in co-pending patent applications PCT/GB2005/004028 and GB0423093.4.

FIG. 1 shows a first embodiment of this fast optical correlator. The correlator acts on a temporal or sequential input data stream 2. This data stream may be, for instance, in the form of an amplitude modulated binary optical signal such as is used in telecommunications and may be streamed from a database to be searched for the existence of certain data. The amplitude modulated input signal 2 is detected by a photodetector 4. The detected data is used to control a phase modulator 6 which modulates the phase of a stable laser 8 to create a temporal binary phase modulated optical signal. High speed phase modulators exist in the field of telecommunications and can deal with very high input data rates. However the data could be input in any form, for instance it may arrive as amplitude modulated electric signals and these may be used directly to control phase modulator 6.

The phase modulated optical data signal is divided into a plurality of optical channels. In this embodiment each optical channel comprises a length of optical fibre $14_1$-$14_N$. Each of the fibre optical channels has a different delay length, each fibre having an incremental delay compared to the previous fibre equal to the bit rate of the system. Thus at the output of the fibres 14 the first fibre will output the phase modulated signal equivalent to one particular bit whereas the next fibre, which has an increased delay, will output the phase modulated signal for the previous bit and so on. Therefore the output of each fibre will be a different bit in the signal. The apparatus therefore converts the temporal optical signal into a parallel optical phase signal. Optical delay means other than optical fibres can also be used.

The output of each fibre 14 is directed by a lens 28 onto part of a phase modulating spatial light modulator (SLM) 18. The spatial light modulator 18 displays a phase modulation pattern corresponding to at least one reference pattern (or it's inverse)—the reference pattern corresponding to some reference data which is sought.

The phase of any one optical channel of the signal exiting the SLM will therefore be a combination of the phase modulation applied for that particular bit of input data and the phase modulation for that part of the reference pattern. Where there is no correlation between the input data and the reference data the phase of the various channels in the resulting optical signal will vary randomly and hence the signal will have a wavefront with varying phase. However, where the reference pattern exactly matches the input data the result will be that every optical channel has the same phase, in other words a plane wavefront will be produced.

The resulting optical signal is focussed by lens 20 to a point detector 22. In the case of no correlation the parts of the signal with one phase will destructively interfere with the opposite phase of the other channels (this is a binary phase system). Therefore the optical signal will not be strongly focussed to the detector 22. However where there is a correlation, all the signal is in phase and hence the signal will be strongly focussed to the detector 22. Thus the intensity of the signal detected at the detector 22 can be used as an indication of correlation.

The SLM 18 may be arranged to display more than one reference pattern—this is useful where it is desired to search for more than one reference data string or where the search string is longer than the number of optical channels. In such a case the outputs of the fibre optics may be replicated into more than one parallel optical signal by replication optics 16. Imagine the outputs of the fibre optic delay lines 14 were arranged as a linear array. Replication optics 16, for instance a Dammann grating, may replicate the linear array of outputs in the transverse direction, i.e. a 40 channel array could be replicated 40 times to form a 40×40 array of outputs where each line is a copy of the parallel optical signal. These would be directed onto the SLM which would likewise be formed into a 40×40 array of modulation areas, each line representing a particular reference pattern.

Obviously each line would have to be focussed separately to its own detector and so a linear array of 40 photodetectors would be used.

Figure 2:
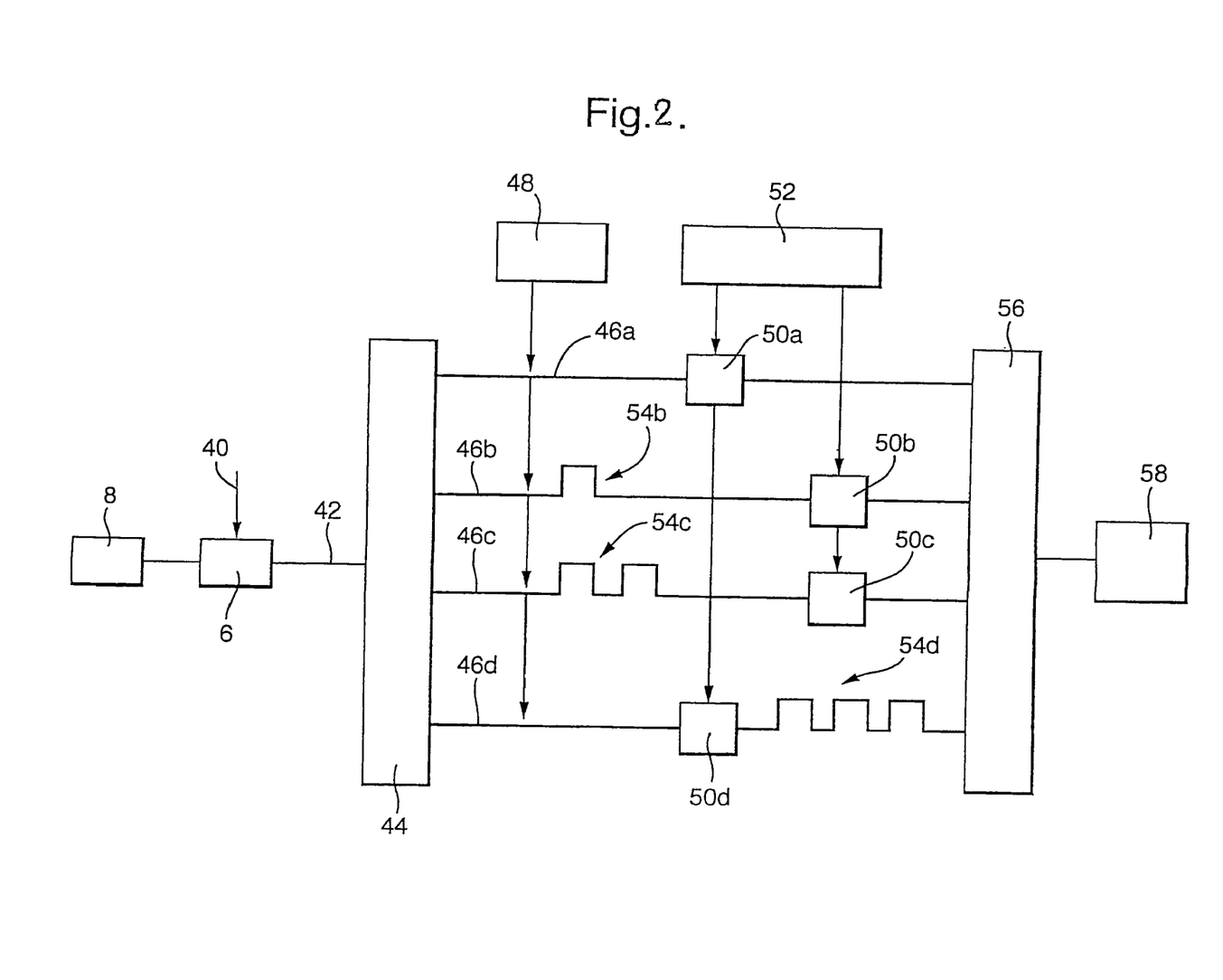
FIG. 2 shows another embodiment of the correlator described in PCT/GB2005/004028.

In another embodiment of this correlator the optical fibre delays are replaced with a series of integrated optic waveguides. FIG. 2 shows this embodiment. Here the input data stream 40 is again passed to a phase modulator 6 to phase modulate the output of laser 8 to produce a temporal phase modulated optical signal.

This signal is passed, via an input waveguide 42, to a 1-N MMI splitter 44. MMI splitter 44 is a multimode interference device which has an input waveguide 42, a multimode waveguide region and N output waveguides 46a ... d (four are shown for ease of reference but in a working device the number of output channels may be much higher). The input optical signal excites multiple modes in the MMI device which is dimensioned such that replicas of the input are re-imaged at each of the output waveguides 46a ... d. MMI splitters of this nature are well know in the art. Waveguides 46a ... d are formed from any convenient material, for instance gallium arsenide, or may be free space waveguides formed in a semiconductor material such as silicon.

Amplitude modulation control 48 is provided for intensity matching to ensure optimal performance.

Each of the waveguides has a different length so as to give a different, incremental delay length in a manner similar to the different lengths of optical fibre described above, with the increment in delay from one waveguide to the next again being equal to the bit time of the incoming data. The skilled person will be well aware of how to construct waveguides of different length, for instance by incorporating additional turns 54b ... d. The waveguides therefore convert the temporal input signal to a parallel optical data signal at the output.

However, unlike the first embodiment where the outputs of the optical fibres were passed to an SLM, each waveguide 46a ... d has an associated phase modulator 50a ... d controlled by phase modulator control 52. The phase modulator control controls the binary phase modulation applied to each waveguide and applies an appropriate phase modulation for a particular reference data string.

The reference phase modulation may be applied at any point in the delay line. The phase modulators need not be aligned and the delay to a particular waveguide may be applied before or after the phase modulator or both. Each waveguide having its own phase modulator means that there is no need to align the output of the optical delay means with an SLM as described above. Further any fine control to an individual channel is easy to achieve.

The phase modulators are integrated electro-optic modulators such as the skilled person would be well familiar with.

The outputs of waveguides 46a ... d form the inputs to an MMI N-1 combiner 56. The MMI combiner couples the outputs of waveguides to a single output from the combiner which feeds to photodetector 58. Where all the inputs to the MMI combiner are in phase the signals constructively add whereas a phase mismatch with cause destructive coupling. MMI combiner 56 therefore effectively performs the same function as lens 20. The intensity on the detector can therefore be used as an indication of correlation as described above.

The principle of replication of the parallel optical signal could also be applied to this embodiment so as to search for several different reference strings simultaneously.

The correlator apparatus described therefore effectively converts input sequential data into parallel optical data by dividing the signal into several optical channels which have successive delays. A reference phase modulation is also applied to each optical channel and when there is a correlation between the reference data and input data each channel will have the same phase which can be detected by interferometric coupling of the optical channels. This apparatus can therefore operate at high speeds as the reference data applied to the SLM or ED phase modulators is effectively fixed for a certain data pattern. However the high data rates involved still require phase modulators that can operate at the bit rate of the system. Also the final detector (or detectors) and associated processing circuitry need to operate at the bit rate of the system. The cost of such components is high and therefore there is a desire to reduce the bandwidth requirements where possible.

Thus according to the present invention there is provided a correlation apparatus comprising a converter for converting an input binary data stream into a parallel data stream for correlation with at least one reference data string wherein the converter comprises a 1:N demultiplexer.

A demultiplexer is a known piece of equipment for performing a serial to parallel conversion. Demultiplexers are sometimes known as serial-to-parallel converters. The demultiplexer has an input by which it receives the input data stream and N different outputs. The demultiplexer effectively stores bits as they are received until it is storing N bits, at which point it outputs a different one of the N stored bits on each of the N outputs. It then stores the next N bits from the input signal. In this way N bits of a temporal or serial input data stream are converted into a parallel data signal.

It will be apparent that the demultiplexer therefore only outputs a signal after it has received N bits and so the output rate from the demultiplexer is slower than the bit rate of the input data stream by a factor of N.

With regard to the optical correlator described above the present invention turns the input data stream into a N-channel parallel data stream. Each of the N different channels of the demultiplexed input data stream would then be used to provide a signal for phase modulation of a separate optical channel. The converter may therefore comprise at least one phase modulator connected to each output of the demultiplexer, each phase modulator acting on a separate optical channel.

It should therefore be noted that the present invention therefore requires a greater number of phase modulators to provide the input data phase modulation as compared with the correlator described above. At least one phase modulator will be required for each output channel of the demultiplexer which will increase the cost and complexity of the system. However the invention lies, at least partly, in the realisation that these phase modulators need only operate an Nth of the speed of the input data due to the presence of the demultiplexer. Further the processing speed of all the downstream electronics is also reduced by the same factor N. The use of the demultiplexer therefore eases the requirements on the components used in the correlator with associated cost savings and increased availability and/or allows a higher data input rate.

Were the demultiplexer to have a large number of output channels, i.e. N was large, say of the order of 40, then the parallel data signal outputs from the correlator could control N phase modulators, each on a different optical channel, and produce an N optical channel parallel signal in that fashion.

However most commercially available multiplexers (at the input data rates of interest, of the order of 10-40 Gigabits a second or possibly higher) tend to be limited to 1:4, 1:8 or 1:16 bit demultiplexers. Preferably commercially available demultiplexers are used and conveniently a 1:8 bit demultiplexer is used.

Therefore each optical channel may additionally comprise a beam slitter and a plurality of optical delays of incrementally increased delay, the incremental delay being equal to N times the bit rate. Thus the principle of optical delay to create a parallel signal can still be used to multiply the number of optical channels from 4 or 8 say to larger numbers. For instance with a 1:8 demultiplexer there may be 4 different optical delays on each channel to give a 32 bit parallel signal.

The optical delay means could be any suitable optical delay, for instance lengths of fibre optic or integrated optics waveguides having different path lengths.

It should be noted that whereas the correlator without a demultiplexer looked at each successive combination of m bits, where m is the number of optical channels in the system, the use of a demultiplexer only looks at certain snapshots of the data. In other words consider a correlator without a demultiplexer which has 32 optical channels. The first complete output from the plurality of optical channels will be the bits 1-32, with data corresponding to the first bit on the most delayed channel and data corresponding to the bit 32 on the least delayed channel. One bit period later the data on each channel will have changed to the next bit in the input data, i.e. the output will be bits 2-33 and so on. Thus every succession of 32 bits of the input data will eventually be created for correlation with the reference data. If the data from bits 21-52 matches the reference data a correlation will be found at that time.

With the demultiplexer though, not every sequence is compared with the reference data. For instance if a 1:8 demultiplexer were used with 8 optical channels, each having 4 delays, the output would again be 32 optical channels. Again the first complete output would be the bit sequence 1-32. However this would persist on the output of the optical channels for a period equal to eight times the bit rate before the output was replaced with bits 9-40. The next output would be bits 17-48 and the one after that bits 25-56. It can therefore be seen that the sequence of bits 21-52 would never be displayed using an apparatus according to the present invention and so the potential correlation with the reference would be missed.

However for several applications the data is not arbitrary and will be arranged in a meaningful form. The skilled person will appreciate that digital data is often transmitted in the form of bytes (8 bits of information) and that actually it would only be wished to search sequences which corresponded to full bytes of information. Finding a correlation between reference data and input data based on the end part of one byte and start of the next would be a false positive. Use of a demultiplexer therefore can ensure that only meaningful sequences of data are available for correlation and that every meaningful combination is presented.

As an alternative to using optical delays to generate more optical channels in another embodiment each output of the 1:N demultiplexer is connected to a series of latch circuits, the latch circuits being clocked at the output rate of the demultiplexer and each latch circuit having an output channel connected to a phase modulator acting on a different optical channel. The latch circuits in effect form a shift register having a plurality of outputs, each output controlling a phase modulator. This circuit may also be known as a type of shift register with tap points between each cell.

Thus the output from the demultiplexer on any particular output channel goes to the first latch circuit. This is clocked at the output rate of the demultiplexer and on each clock pulse the data is both passed to the next latch circuit in the chain and also output to control a phase modulator. Consider the first output of the demultiplexer. This data is output to the first latch circuit and can also be used to address a phase modulator on a first optical channel. At the next clock time the value of the data stored in the first latch circuit is passed to the second latch circuit in the chain and also used to address a second phase modulator. At the next clock time the value of the data is passed onto the next latch circuit and used to address a different phase modulator. It can therefore be seen that on any one clock pulse the first latch circuit in the series is outputting the data value it holds, the second latch circuit is outputting the value of the previous data and so on. Thus the latch circuits act as a series of (clocked) delays in the electrical, rather than the optical, domain. A 1:8 demultiplexer could therefore be used with a series of four latch circuits on each of the eight outputs to give a 40 bit output.

Eliminating the need for optical delays can be advantageous, especially as compared to the use of fibre optic delays. Fibre optic delays can exhibit variations with temperature that can effect the phase of the carried light. Using an electronic delay eliminates the need for fibres and hence removes this potential source of error.

It should be noted that for lower input data rates the use of a series of latch circuit offers the opportunity to provide a series of electrical delays without the need for a multiplexer. For instance a series of 39 latch circuits in series clocked at the actual bit rate, with tap points between each circuit, could convert a 40 bit long sequence into a parallel electrical signal directly to address the phase modulators. Therefore in another aspect of the invention there is provided a correlation apparatus comprising a converter for converting an input binary data stream into a parallel data stream for correlation with at least one reference data string wherein the converter comprises a series of latch circuits.

However at high data rates the latch circuitry may not be able to function that quickly and use of a demultiplexer reduces the clock rate at which the latch circuits operate. It also reduces the bandwidth of the detectors used to detect correlation.

The invention has been described in relation to an optical correlation apparatus using modulation of optical phase with both reference and input data modulations to determine the existence of a correlation through interferometric combination.

The present inventors have also realised however that it is possible to do the correlation in the electronic domain as well, thus realising an all electronic correlator. The present invention, using latch circuits to create electrical delays, can be used to create a parallel electrical binary data signal representing the input data. This parallel data signal can be compared with a reference data signal to determine whether there is a match or not. The combination is in effect a bit addition operation—adding the value of the particular bit in a channel of the parallel input data signal with a reference value. Where the two values are identical the result is zero: binary 1+binary 1=binary 0, binary 0+binary 0=0. However a mismatch case leads to value 1: binary 1+binary 0=binary 1 and binary 0+binary 1=binary 1. Therefore performing a logic combination on the data value of the input data for each channel with the relevant reference data will generate 0 where there is a match and 1 where there is no match. In fact it can be beneficial to use bit subtraction or bit difference as the detection criteria, converting the correlator in to a "zero difference" discriminator.

The combination for each channel can be performed by using an Exclusive OR (ExOR) logic arrangement to combine the values from the data and the reference signals. A summing resistor is provided in series with the output of each logic arrangement and all channels are then combined using a level detection circuit arranged to trigger on a zero difference.

The present invention is equally applicable to such an all electronic correlator which is covered in a co-pending patent application.

The invention will now be described by way of example only with reference to the following drawings of which;

FIGS. 1 and 2 show different embodiments of correlation apparatus as described in PCT/GB2005/004028 and GB0423093.4. The operation of these correlators has been described above.

Figure 3:
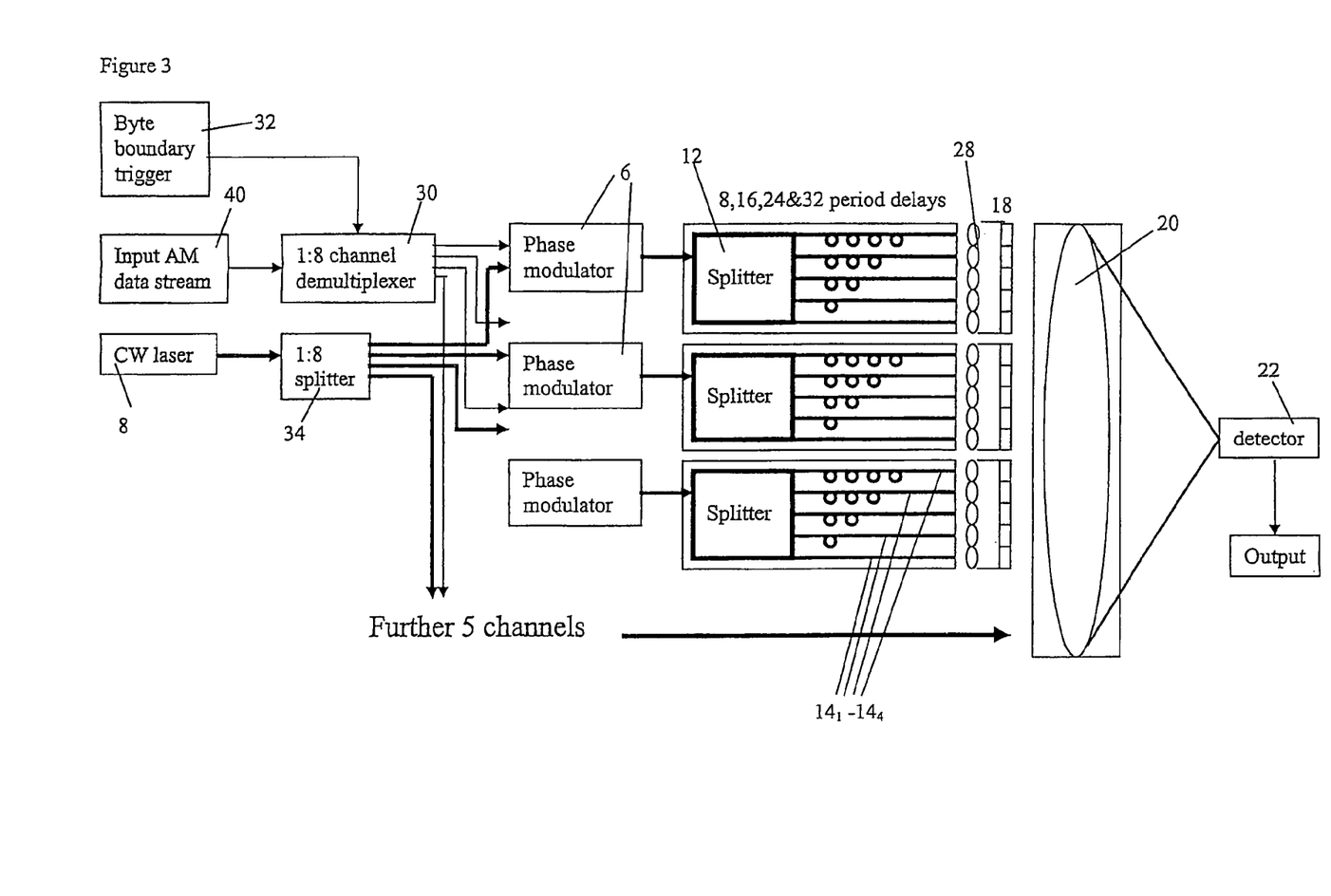
FIG. 3 shows a schematic of correlator according to one embodiment of the present invention.

FIG. 3 shows a correlator according to the present invention, in which elements which are the same as in FIG. 1 or 2 are labelled using the same numerals.

An input data signal 40, in form of amplitude modulated electrical signals, is received by a 1:8 demultiplexer 30. (e.g. lnphi 5081 DX 50 Gbps 1:4 demultiplexer or Broadcom BCM8125 1:16 demultiplexer). The demultiplexer 30 is controlled by byte boundary trigger 32 to convert an eight bit byte in the series input data into an eight channel parallel data signal. Thus at a rate of one eighth of the bit rate of the input data the demultiplexer 30 outputs a different bit value on each of its eight output channels (note only three channels are shown for clarity).

Each of the outputs of the demultiplexer 30 is used to control a different phase modulator 6 acting on a different optical channel. A stable continuous wave laser 8 emits light which is incident on a 1-to-8 way beam splitter 34 to create the eight different optical channels, each optical channel having an associated phase modulator 6. In this way a parallel 8 channel optical signal is created, wherein the phase of each channel replicates the input data. Note that each phase modulator only needs to work at a rate equal to one eighth of the input bit rate.

To give the required number of bits for comparison each optical channel is then input into an optical delay means having four optical delay lines with incremental delays, each successive delay line being delayed with respect to the previous line by a delay equal to eight times the bit rate (i.e. the update rate of the output from the demultiplexer). In other words the successive delays are 8, 16, 24 and 32 times the input bit period. In this way a parallel optical signal consisting of a sequence of 32 bits of the input data is formed.

As shown each optical delay means has a 1-to-4 way beam splitter 12 and fibre optic delay lines 14 of differing length, effectively the same arrangement as the single delay means shown in FIG. 1. Any suitable optical delay means could be used however and in particular integrated optics waveguides could be used, i.e. waveguides formed in semiconductor material.

The output of each delay line 14 is focussed by a lenslet in lens array 28 onto an appropriate part of a phase modulating SLM 18. Note that an array of SLMs could be used, one for the output of one or more delay means or a single large SLM could be used for all channels. The phase modulating SLM displays the required reference phase modulation pattern.

If there is a correlation the outputs from the or each SLM are in phase and are strongly focussed by lens 20 onto detector 22. However where there is no correlation the phases destructively interfere to give a reduced signal.

Again it should be noted however that the phase modulation pattern only changes at a rate equal to one eighth of the bit rate, due to the presence of the demultiplexer. Hence the detector 22 also need only detect variations at a rate equal to an eighth of the bit rate. This greatly eases the requirements for the detector and subsequent processing electronics allowing more readily available components to be used in high data rate systems.

Figure 4:
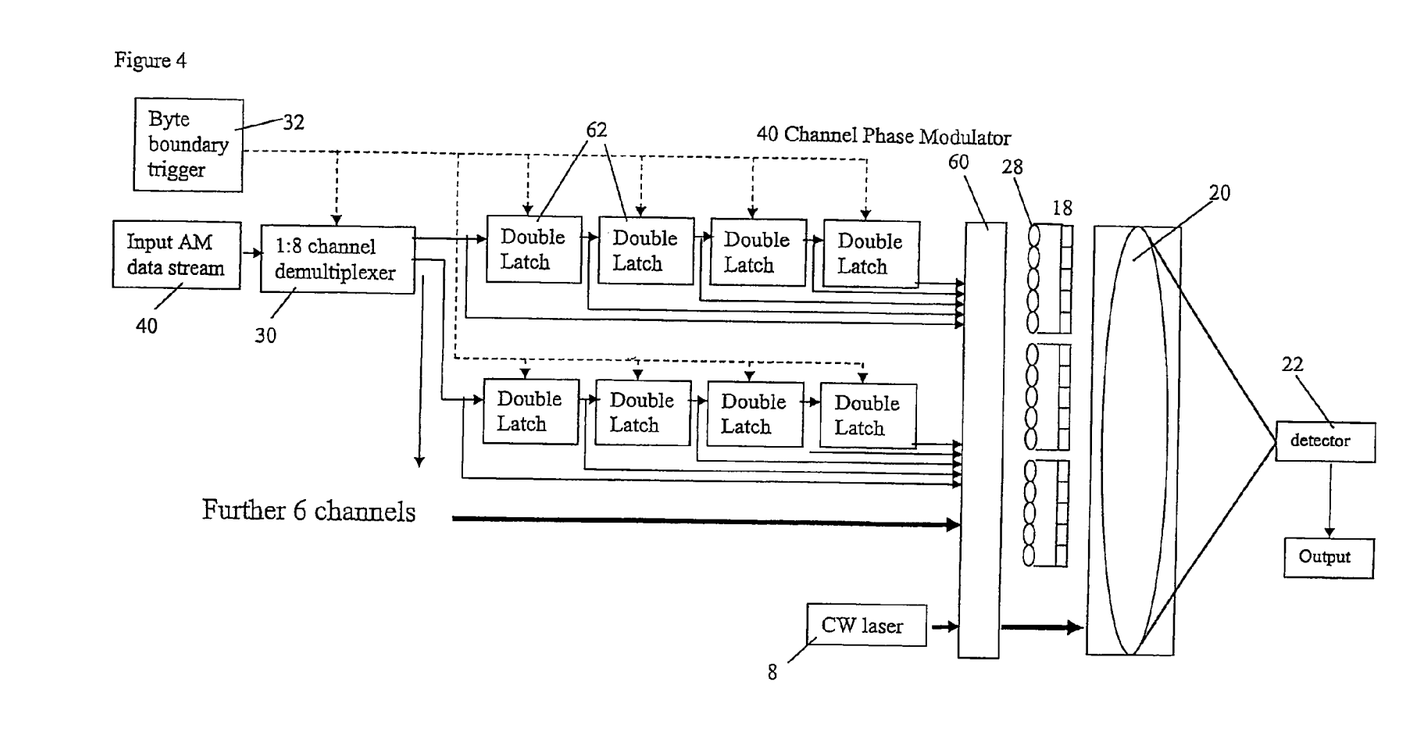
FIG. 4 shows a schematic of a correlator according to another aspect of the present invention.

FIG. 4 shows an embodiment of the invention which replaces the optical delay means with an electronic delay. Again like components have like numerals. As described above with respect to the first embodiment the AM input signal 40 is received by 1:8 demultiplexer 30 controlled by byte boundary trigger. Each output of the demultiplexer 32 is also connected to a phase modulator 60 but each output is also connected to the input of a series of four latch circuits $62_1$-$62_4$. Each latch circuit is connected to the next and an output of each latch circuit is also connected to the phase modulator 60. The latch circuits 62 are also controlled by byte boundary controller 32 and the series acts as a shift register. The data value output from the demultiplexer is therefore rippled along the series. At any update time the data output from the demultiplexer will be output to the phase modulator 60. At the same time the first latch circuit in the series for each channel will output the previous data and the second latch circuit in each series will output the data previous to that and so on. Thus a 40 channel electrical signal is passed to the phase modulator 60. Phase modulator 60 may be a 40 channel modulator acting on the output of laser 8 or a series of 40 individual phase modulators may be used on a 40 separate optical channels.

The output from the phase modulator is focused by lens array 28 onto one or more SLMs 18 to provide correlation in exactly the same manner as described above.

Thus the use of latch circuits allows for an electronic delay means rather than an optical delay means. The use of electronic delay means is enabled, at high data rates, by the use of a demultiplexer to reduce the update rate, and offers advantage in that optical phase variations influenced by temperature etc. do not play a part.

Figure 5:
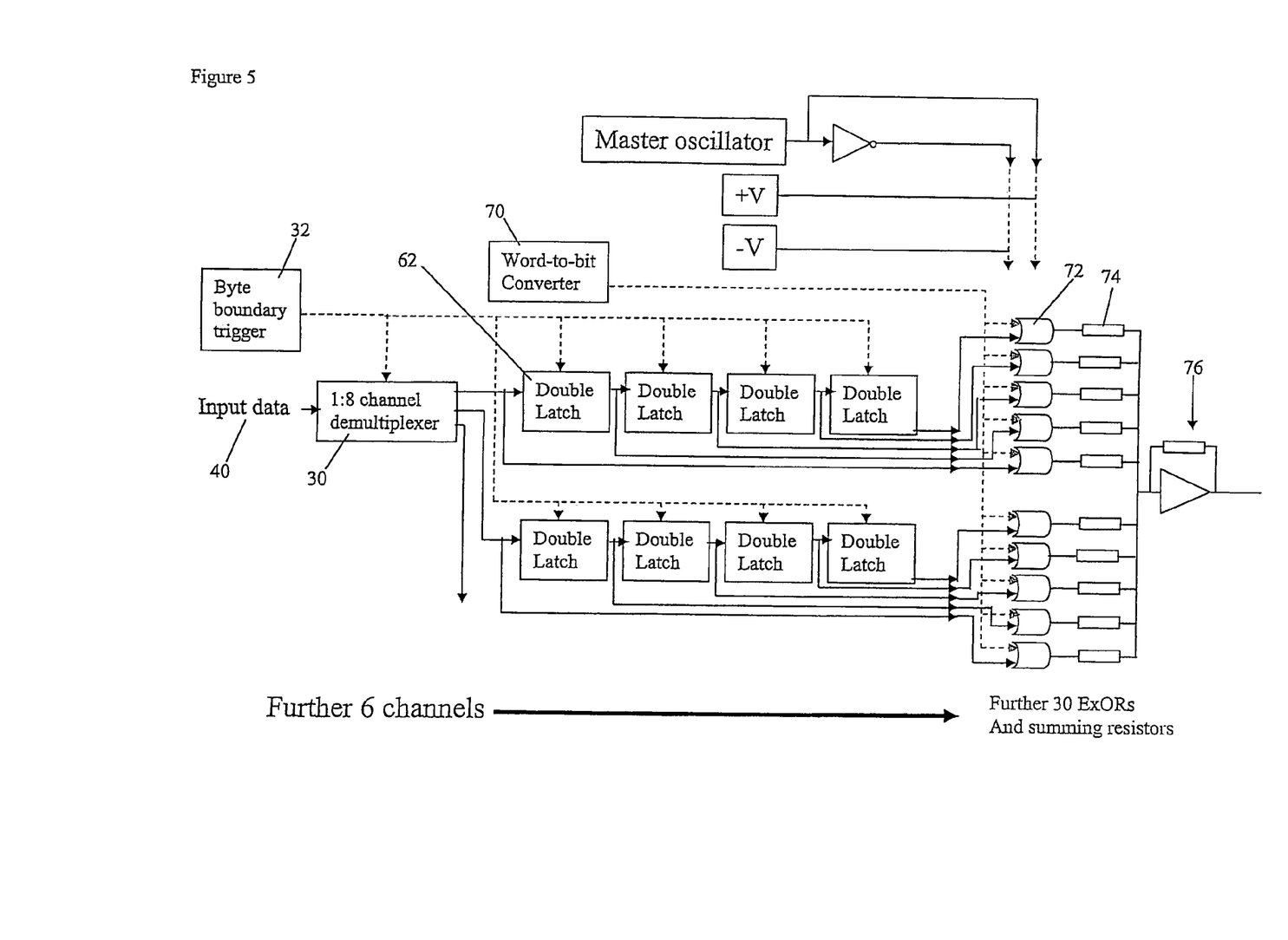
FIG. 5 shows an all electronic correlator incorporating the present invention.

FIG. 5 shows an all electronic version of the correlator apparatus. The all electronic version has the same input 40, 1:8 demultiplexer 30, byte boundary controller 32 and series of latch circuits 62 to generate a 40 channel parallel electric signal. However the correlation is also done electronically.

The correlation is performed on the basis of bit addition, i.e. the principle that if the particular bit in the input data matches the relevant reference bit the sum will be zero whereas if there is a mismatch the sum will be one. Thus for a complete match the sum of all the outputs from all the channels should be zero and a value of greater than zero is indicative of a mismatch.

A word to bit converter 70 therefore creates a parallel electronic binary data signal equal to the reference data sought. The relevant output from the word to bit converter is combined with the relevant channel of the parallel input data signal using Exclusive OR logic arrangements 72 together with summing resistors 74. The combination of all the channels is then monitored by difference detection circuit 76 which is arranged to trigger a response on a zero difference. In this way an all electronic correlator can be realised, for instance on single chip such as an ASIC. Several correlators could run in parallel to look for different reference data and a long search string may be broken up into several different parts.

The invention claimed is:

1. A correlation apparatus comprising a converter for converting an input binary data stream into a parallel data stream for correlation with at least one reference data string wherein the converter comprises a 1:N demultiplexer, wherein each output of the 1:N demultiplexer is connected to a series of latch circuits, the latch circuits being clocked at the output rate of the demultiplexer, each latch circuit connected to a phase modulator for acting on a plurality of different optical channels, wherein outputs of said optical channels provide a parallel data stream for correlation with said at least one reference data string.

2. A correlation apparatus as claimed in claim 1 wherein the 1:N demultiplexer is 1:4, 1:8 or 1:16 demultiplexer.

* * * * *